(12) United States Patent
Arrighetti

(10) Patent No.: US 7,982,634 B2
(45) Date of Patent: Jul. 19, 2011

(54) SYSTEM FOR DETECTING VEHICLES

(75) Inventor: Stefano Arrighetti, Seregno (IT)

(73) Assignee: KRIA S.r.l., Seregno (Milano) (IT)

( * ) Notice: Subject to any disclaimer, the term of this patent is extended or adjusted under 35 U.S.C. 154(b) by 394 days.

(21) Appl. No.: 12/293,947

(22) PCT Filed: Mar. 19, 2007

(86) PCT No.: PCT/IB2007/000761
§ 371 (c)(1),
(2), (4) Date: Sep. 22, 2008

(87) PCT Pub. No.: WO2007/107875
PCT Pub. Date: Sep. 27, 2007

(65) Prior Publication Data
US 2009/0207046 A1    Aug. 20, 2009

(30) Foreign Application Priority Data

Mar. 22, 2006  (IT) .............................. TO2006A0214

(51) Int. Cl.
*G08G 1/017* (2006.01)
*H04N 7/18* (2006.01)
*G06K 9/00* (2006.01)
(52) U.S. Cl. ........ 340/937; 340/928; 340/933; 348/148; 348/149; 348/153; 348/48; 382/104; 382/105; 382/154
(58) Field of Classification Search ................... 340/937; 348/149; 382/105
See application file for complete search history.

(56) References Cited

U.S. PATENT DOCUMENTS

| 5,805,209 A | * | 9/1998 | Yuge et al. | 348/149 |
| 5,910,817 A | * | 6/1999 | Ohashi et al. | 348/159 |
| 6,914,541 B1 | * | 7/2005 | Zierden | 340/937 |
| 6,970,102 B2 | * | 11/2005 | Ciolli | 340/933 |
| 2004/0054513 A1 | | 3/2004 | Laird et al. | |

FOREIGN PATENT DOCUMENTS

DE            44 46 642 A1      6/1996
(Continued)

OTHER PUBLICATIONS

R. Hartley, A. Zisserman "Multiple View Geometry in Computer Vision", Cambridge University Press, 2004).

(Continued)

*Primary Examiner* — Donnie Crosland
(74) *Attorney, Agent, or Firm* — Heslin Rothenberg Farley & Mesiti P.C.; Victor A. Cardona, Esq.

(57) ABSTRACT

A system to detect the transit of vehicles having license plates includes at least one video camera to detect license plates capable of framing the plates of said vehicles and, preferably, at least one video camera to detect vehicles capable of framing a zone of transit of said vehicles having license plates. A series of processing operations is capable, starting from the video signals generated by the video camera to detect license plates, of detecting the presence of a vehicle in transit and, starting from the video signals generated by the video camera to detect vehicles, of detecting the position and three-dimensional shape of vehicles in transit in said zone. A supervisor module aggregates the results of these processing operations to generate records of information each identifying the modality of transit in said zone of a vehicle identified by a given license plate that has been recognized.

21 Claims, 5 Drawing Sheets

FOREIGN PATENT DOCUMENTS

| | | |
|---|---|---|
| EP | 1 542 191 A1 | 6/2005 |
| EP | 1 542 191 B1 | 7/2006 |
| GB | 2 266 398 A | 10/1993 |
| WO | WO 93/19441 A1 | 9/1993 |
| WO | WO 94/28377 A1 | 12/1994 |
| WO | WO 98/19284 A2 | 5/1998 |
| WO | WO 98/19284 A3 | 5/1998 |
| WO | WO 2004/100102 A1 | 11/2004 |

OTHER PUBLICATIONS

O. Faugeras "3D-Computer Vision", MIT Press (1993).

T. Jebara, A. Pentland "3D structure from 2D motion", IEEE Signal Proc. Mag. vol. 16—1999).

C. Stiller, J. Konrad "Estimating Motion in Image Sequences", IEEE Signal Proc. Mag. vol. 16 (1999).

H. Bai et al. "A fast license plate extraction method on complex background", IEEE Intell. Tran. Sys. vol. 2 (2003).

Written Opinion of Corresponding International Application No. PCT/IB2007/000761 dated Oct. 24, 2007.

International Search Report of Corresponding International Application No. PCT/IB2007/000761 dated Oct. 24, 2007.

* cited by examiner

SYSTEM FOR DETECTING VEHICLES

CROSS REFERENCE TO RELATED APPLICATIONS

This application is a 371 national stage filing of PCT International Application No. PCT/IB2007/000761, filed on Mar. 19, 2007, and published in English on Sep. 27, 2007, as WO 2007/107875 A2, and which claims priority to Italian Patent Application No. TO2006A000214 filed on Mar. 22, 2006, the entire disclosures of which are incorporated herein by reference.

FIELD OF THE INVENTION

The invention relates to systems for detecting vehicles and has been developed with particular attention to its possible use in detecting violations of traffic regulations, for example failure to stop at red traffic lights, exceeding speed limits, unauthorised overtaking and access.

DESCRIPTION OF THE KNOWN TECHNOLOGY

Systems for automatically identifying vehicles that infringe traffic regulations must respond to the requirements of reliably detecting the violation and producing clear documentation; they must also guarantee drivers' safety and be difficult to tamper with.

Existing systems generally comprise detection sensors linked to cameras that, for example, take sequences of two still photographs to demonstrate the movement of the vehicle committing the violation.

Transits are usually detected by sensors of the presence of a vehicle (inductive loops, lasers, radar, etc.), all devices whose installation in general requires road traffic to be halted and whose operation involves expensive maintenance. To date these sensors have represented a necessary part of the systems in question, technological alternatives not being available that can guarantee better or at least equal performance in terms of reliable detection (that is the probability of correctly detecting violations) and accurate measurement of the kinematic variables of the vehicle committing the offence (typically position and speed at a clearly specified moment in time).

The possibility of using video cameras as detection sensors is however known (see, for example, WO-A-2004/100102 and US-A-2004/054513) but this only in entirely generic terms, specific embodiments not being dealt with, nor the reliability and accuracy of the measurements obtained, and without there existing at present any operative embodiments of these inventions.

It is also known that video detection based on simple movement (motion detection and/or the so-called "virtual loops") is subject to frequent false alarms in the absence of other observations that confirm detection.

Furthermore, when applied to the context of detecting traffic violations, the techniques in question in the end acquire a "forensic" profile of some significance.

In the solutions in current use, documentation of the infringement is normally produced by cameras that, after detecting the vehicle, take some (two) images of the event detected by the sensors associated to them. During the hours of darkness, the lack of sunlight in the framed area is replaced by illuminating the vehicle with flash. However, much more light is often reflected from the license plate than from the bodywork of the vehicle, thus the dynamic range of the scene luminance is too wide for the video camera's capabilities (whether it employs photographic film or is of the digital type) to enable both the license plate area and the model and colour of the vehicle to be recognisable at the same time, with the effect of producing documentation that cannot be used for the purpose of disciplinary proceedings.

An evident and specific limitation of analog cameras lies in the limited length of the roll of film, that is the small number of photographs that can be taken; this requires personnel to visit the installation frequently to replace the film manually and develop it, after which if appropriate the images are acquired by a scanner for filing purposes.

Digital cameras are beginning to replace those employing photographic film, partially reducing these drawbacks; however, they share with analog cameras the limitations due to wear on moving parts (shutter, diaphragm).

Furthermore, all systems that use cameras are unable to document violations that take place in rapid succession; for example they are not capable of documenting the frequent cases in which a first infringing vehicle in transit is immediately followed by others, with an overlap in time between the end of one vehicle violation and the start of the subsequent vehicle.

Some systems based on video cameras (thus with continuous image acquisition) have a more evident limit when operating in conditions of poor illumination, in particular with regard to the legibility of the license plate. To avoid the "blurred" effect of the vehicle in movement, they operate with a very short exposure time and with the help of flash, thus using the video camera only to take some images, in the manner of a normal camera.

Some systems provide an automatic reading of the license plate in order to integrate the photographic documentation with information necessary for the subsequent identification of the owner of the vehicle. In general, this reading is not used as an alternative to the above-mentioned sensors to detect the event; the post-processing is simply accessory to the documentation, being performed after the vehicle has been detected and the images acquired.

A further requirement that must be taken into account consists of the fact that systems to ascertain infringements must respond to severe safety requirements. In particular they must not have a negative influence on driving, above all in consideration of the dangerous condition intrinsic to the manoeuvre or the place the driver is passing through.

For example, sudden lighting of the flash is frequently contested since it is held to be potentially dangerous for the associated risk of dazzling: even if the system photographs the "detected" vehicle from behind, a driver proceeding in the opposite direction to that controlled might be dazzled by it.

Again, in view of their current use being chiefly disciplinary, detection systems are exposed to acts of vandalism: this also due to the fact that such systems are not normally supervised. Typical acts of tampering consist in deactivating the detection sensors and blacking out (or blinding) the image-acquisition devices.

OBJECT AND SUMMARY OF THE INVENTION

From the description of the known technology given above, the need emerges to have available detection systems that are free of the limitations and drawbacks indicated above and that, in particular:
  do not require traffic to be halted during installation and/or
    do not require expensive maintenance during their operation;

are completely reliable in terms of correct detection of violations (in particular with regard to false alarms) and of accuracy of measuring the kinematic variables of the infringing vehicle;

are free of the technical drawbacks intrinsically linked to the use of cameras (be they of the analog or digital type) and of flash;

enable violations that take place in rapid succession to be detected and documented;

are capable of operating in conditions of poor illumination, in particular with regard to the legibility of the license plate;

cannot be considered such as to have a negative influence on driving;

are intrinsically protected against (or at least little exposed to) acts of vandalism.

The present invention aims to meet these needs in full.

According to the present invention, this object is achieved thanks to a system having the characteristics called for specifically in the ensuing claims.

The claims form an integral part of the technical instruction provided here in regard to be invention.

In brief, in what is at present the preferred embodiment, the invention gives rise to an automatic system consisting of video cameras and electronic computers capable of detecting and documenting infringements as well as of identifying the owner of the vehicle, through the combined use of multispectrum video cameras and of license plate reading procedures and three-dimensional analysis of the movement of the vehicle.

Preferably, the proposed system is based on the combined use of different video cameras, electronic computers and image processing procedures that eliminate the need for external detection sensors and overcome the limitations of current technologies, producing improved detection results and more detailed documentation of the event, at the same time eliminating problems of safety and the risk of the installation being tampered with.

BRIEF DESCRIPTION OF THE ATTACHED DRAWINGS

The invention will now be described, by way of non-limiting example, with reference to the attached drawings, in which.

DETAILED DESCRIPTION OF SOME EMBODIMENTS OF THE INVENTION

The following detailed description relates, by way of example, to the possible use of a system of the type described in correspondence with a road intersection C served by traffic lights of which one of the traffic lights S is visible. This is in order to detect infringements of the traffic law essentially relating to:

failure to stop at the intersection when the traffic lights are red, and/or exceeding a speed limit.

Figure 1:
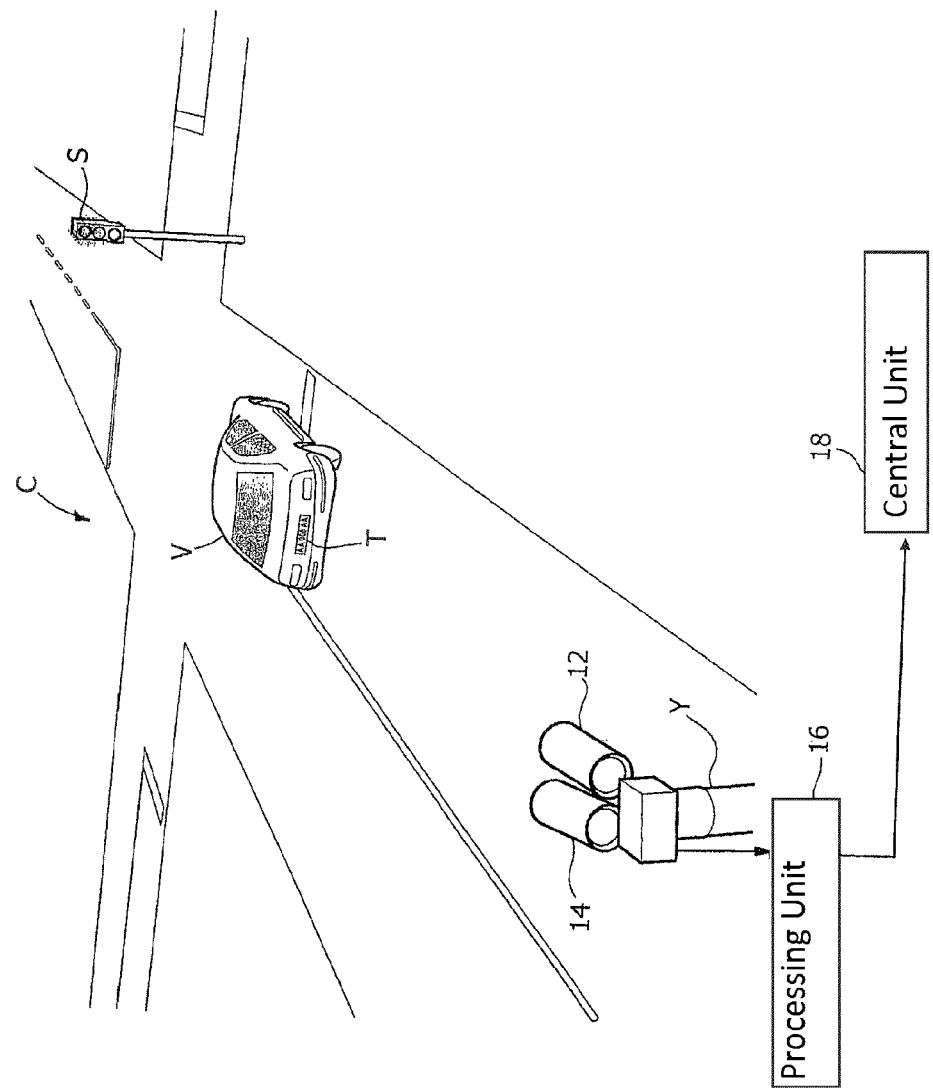
FIG. 1 is a general view of the system described here, shown in a typical environment of use.

In the configuration to which FIG. 1 relates, the system (indicated overall with 10 in the diagram in FIG. 4) comprises a plurality of installations installed on a pole Y and including a pair of video cameras 12, 14 (for preference the first infrared and the second colour) linked to a processing unit 16 (shown in FIG. 1 as situated in the neighbourhood of the video camera), in its turn communicating with a central unit 18, in general at a remote control centre.

Connections among the video cameras 12 and 14, the processing unit 16 (or the various parts that make it up) and the central unit 18 are generally through cable, although wireless type connections cannot be ruled out.

Figure 4:
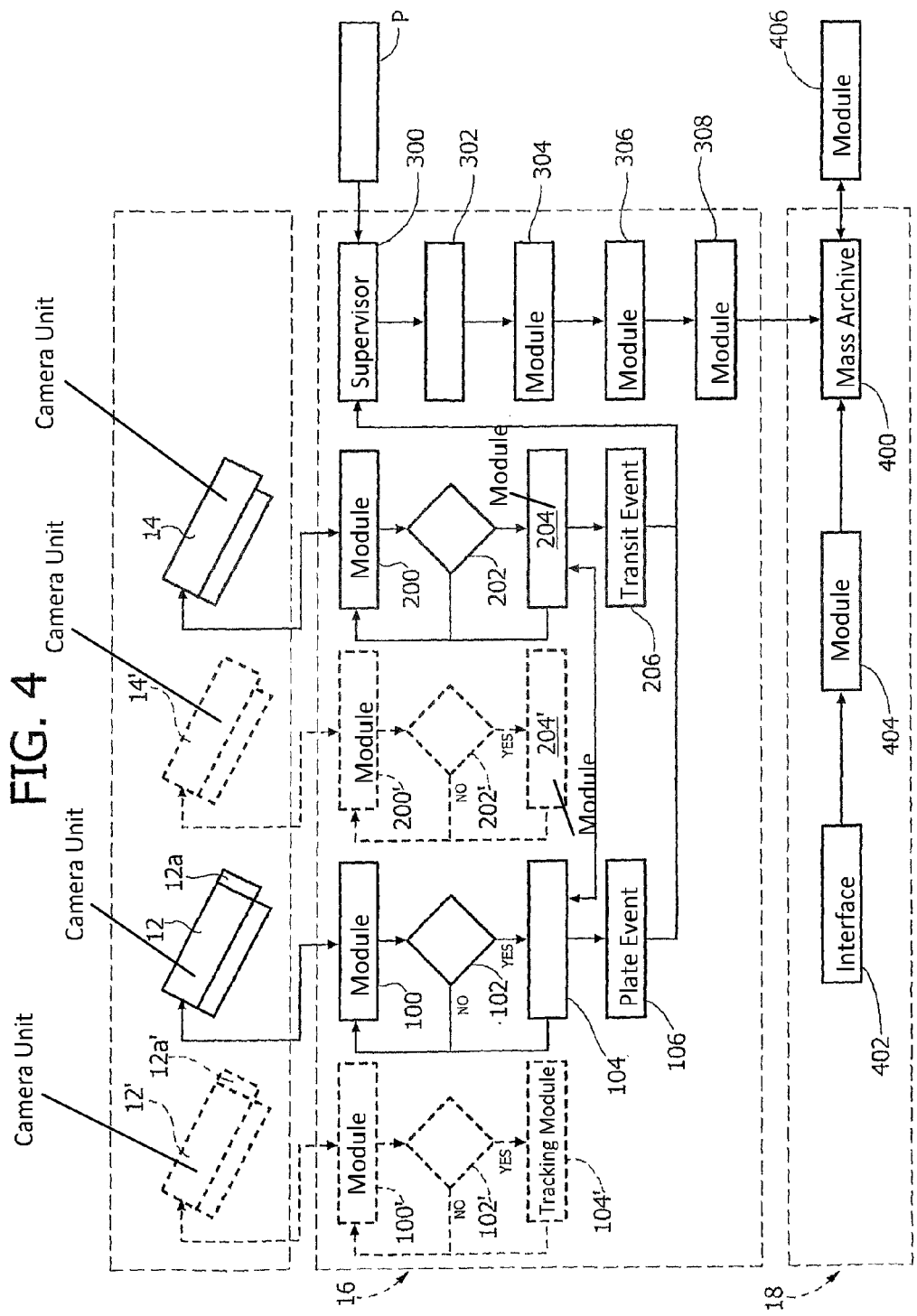
FIG. 4 is a functional block diagram showing the architecture and functions of the system described here.

For clarity of illustration, and by way of a preliminary, note that:

although shown and described here as separate units (according to the embodiment at present preferred) the two video camera units 12, 14 may in reality be integrated into a single image-acquisition device;

although shown here installed on one and the same pole Y, the two video camera units 12, 14 may be installed on different support structures, thus in positions at least partially differing one from the other;

in applications requiring stereometric measurements, the two video camera units 12, 14 are respectively doubled with the addition of two further video camera units 12', 14' (see FIG. 4) if desired integrated with one other, but with an intrinsic advantage linked to their possible installation in positions at least partially differing with respect to the video camera units 12, 14;

whereas the representation in FIG. 1 hypothesises the presence of two respective video camera units 12, 14 for each of the (four) roads converging at the intersection C, the system according to the invention may also be configured so as only to provide detection on one of the roads converging on the intersection C and/or may provide for the same video camera's being used for traffic moving in more than one direction: this holds both for the video camera or cameras whose function is to acquire "panoramic" views of the intersection, and for the video camera or cameras whose function is to detect license plates; and the sharing of the processing functions between the processing unit 16 and the central unit 18 shown in FIG. 4 is of a purely exemplary nature and may be modified depending on the specific requirements of use; in particular, the processing unit 16 may comprise both modules that are associated (or integrated) with the video cameras 12 and 14, and remotely-situated modules, if desired located at the unit.

Figure 2:
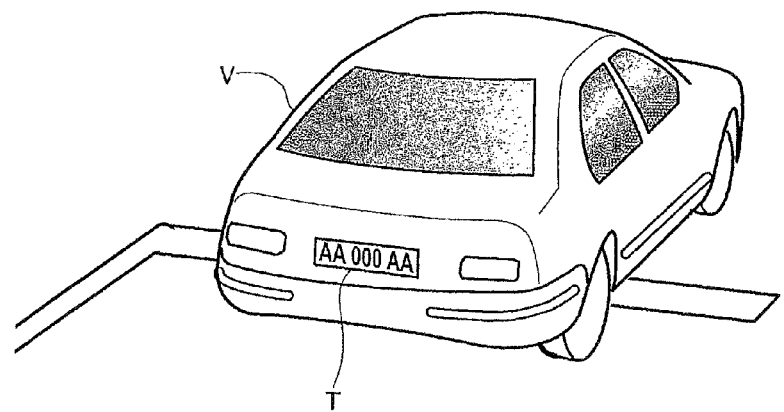
FIGS. 2 and 3 show in greater detail the criteria with which the system described here observes the environment of use.
Figure 3:
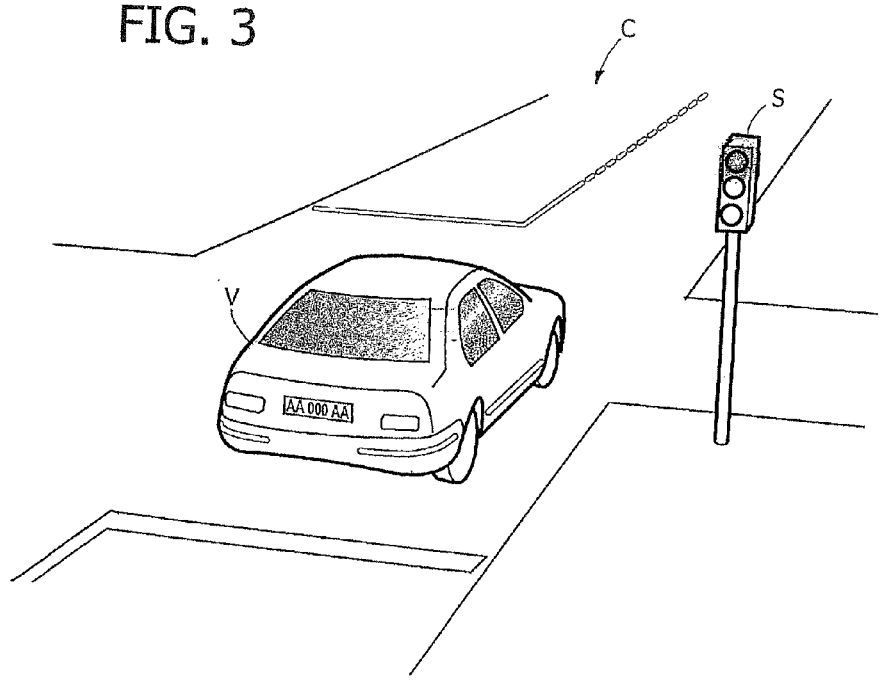

To return to the example shown in FIG. 1, it will henceforth be assumed that the video camera 12, preferably operating in the infrared field, is oriented and adjusted so that it can frame and "read" the license plates of passing vehicles (that is according to the field of view in FIG. 2). Similarly, it will henceforth be assumed that the video camera 14, for preference a colour video camera operating in the field of visible light, is oriented and adjusted so as to frame the intersection C, or at least the part of it through which will pass the vehicles whose license plates the associated video camera 12 is capable of reading, in a panoramic manner (that is according to the field of view in FIG. 3).

In this context, the types of video cameras 12, 14 and their combined use are of particular importance. The system acquires the signals from a number of video cameras in a synchronised manner and processes them in real time in units 16 and 18.

As has already been said, the video cameras 12 and 14 have different characteristics and provide images appropriate for two different system aims: automatic license plate reading (video camera 12) and automatic recognition of the vehicle and its movements (video camera 14). Thanks to this, the system produces high-quality documentation of the violation that is difficult to contest.

The system thus defined may be installed with great ease and typically requires intervention at a single point where the image-acquisition unit consisting of the two video cameras 12 and 14 is installed on the pole Y. The relative calibration procedure, required to reliably achieve metric measurements on the images, is extremely simple and can be guided from a specific man-machine interface.

For the remainder, the system does not require the use of sensors installed in the field, in particular at vehicle height, and thus it is difficult to tamper with. Any changes in the position of the video cameras with respect to the scene observed are immediately detectable by the central unit 18.

The image-acquisition unit formed of the two video cameras 12 and 14 sends the relative video signals to the unit 16 and thus is not destined to store the images locally. Thus the image-acquisition unit 12, 14 does not need to be easily accessible for data-downloading operations. Thus it may be installed at a height (e.g. 5 metres) greater than that of existing traditional systems. This consideration drastically reduces the risk of the video cameras' being blacked out and of their being severely tampered with.

It should also be noted that any change in the framing of the two video cameras 12 and 14, even their (accidental or criminal) partial or total blacking out are automatically detected by the specific control function, which periodically checks that the scene framed is always that defined at the time of installation.

The image-acquisition unit 12, 14 may be linked to the processing unit 16 through known technologies (copper cables, optical fibres, radio bridges). Thus the processing unit 16 may arbitrarily be installed at a distance from the area to be controlled and if desired may be concealed. This fact also helps to reduce the risk of the system's being tampered with.

The connection between the processing unit 16 and the central unit 18 enables the documentation to be transferred in real time from where it is produced to premises that will certainly be supervised and more secure. Thus the system, even should it be tampered with, does not lose documentation of violations detected previously. The use of cryptography reduces the risk of computerised access and attack on the violations detected, at the same time guaranteeing confidentiality of the relative information.

Preferably, the video camera 12 is capable of detecting near infrared radiation (IR, 700-1000 nm). It is fitted with a "telephoto" lens that frames at high image resolution a limited portion of the zone it is desired to control, but through which the vehicle V must of necessity pass.

Preferably, the video camera 14 detects visible light (colour, 400-700 nm) and is fitted with a "wide-angle" lens that frames at lower image resolution the entire zone in which the violation takes place.

In general, in the case of vehicles failing to stop at red traffic lights, the colour video camera 14 also frames the traffic light S itself to document the fact that the red light showed (hence the interest in the video camera 14 being in colour, a characteristic that is not in itself essential for the simple purpose of shooting a panoramic view of the intersection C).

As has already been said, in some application contexts it is necessary to install a number of video cameras of the two types. However, for simplicity of illustration, the case described henceforth, with no loss of generality, will be that of a single video camera 12 and a single video camera 14.

However they are installed (immediately adjacent to each other or at some distance) the two video cameras 12, 14 in practice coincide for application purposes since the field framed by the first is contained within the field framed by the second.

The distance between the video camera 12 and the vehicle V may vary between 10 and 20 metres. Generally, a specific infrared illuminator 12*a* is associated to the video camera 12, and emits a wavelength within the range of sensitivity of the video camera 12, irradiating the scene in a stroboscopic manner synchronised with the sensor of the video camera.

Infrared is not visible and, in the spectrum between 700 and 1000 nm and at the power emitted to illuminate the license plate (approximately 3 mW), it is completely incapable of creating disturbance or harm to the human eye and thus does not involve the risk of dazzling drivers of vehicles, providing the system with maximum safety.

The sole use of non-visible and non-harmful IR illuminators and the use of video cameras of small size and of identical design to video-surveillance cameras makes the system innocuous and virtually imperceptible to the driver. Thanks to these characteristics the system cannot induce dangerous behaviour among drivers.

The material from which vehicle license plates T are made possesses a high index of reflection including to infrared radiation, and this guarantees the perfect visibility of the vehicle license plate at any speed of transit and in all illumination and atmospheric conditions.

The acquisition time (shutter speed) of the video camera 12 is variable in a controlled manner depending on the luminosity reflected by the license plates T. The range of variability of the shutter of the video camera 12 can be configured and the upper limit, that is the longest exposure time the video camera 12 can use, is in any case extremely short and is calculated such that movement of the vehicle does not cause image blurring effects greater than the thickness of the characters on the image produced, and thus guarantees the license plate T will be legible.

Similarly, the shutter of the video camera 14 and the diaphragm of the lens automatically vary during the day, guaranteeing the entire image will always be clearly visible. The range of variability of the shutter of the video camera can be configured and the upper limit, that is the longest exposure time, is parametrised such that even during the night normal street lighting provides good visibility of the vehicle V and enables the zone through which it passes to be recognised.

It will be appreciated that the above adjustment functions are part of the current equipment of video cameras (including for use in the consumer sector), which makes it superfluous to provide a description in greater detail here.

The two video cameras 12 and 14 may have, at the same instant in time, different exposure times; in particular the video camera 14 may have a longer exposure time. In principle, this might compromise the absolute sharpness of the image (in colour) due to a slight blurring effect due to the movement of the vehicle V. But the longer exposure makes both the vehicle V and the area in which the violation occurs more easily recognisable.

The digital images acquired by the two video cameras 12 and 14 are provided (again according to what is now a current solution) with a time/date imprint that marks the exact instant at which the image was acquired in a manner that is difficult to modify. This enables images produced by different video cameras to be associated. Synchronisation of image acquisition, certified by said time/date imprints, guarantees they are simultaneous and thus that they refer to the same event.

The set of video cameras 12 and 14 thus constitutes a multi-spectrum sensor (IR+colour) able to logically combine the characteristics of both video cameras. By "logically combine" is meant an operation in which the two images, while remaining physically distinct, may be placed in geometric relationship through 3D viewing processes, as will be described in more detail below.

It has already been said that, although illustrated and described here as distinct units, the two video camera units 12, 14 may in reality be integrated into a single image-acquisition device: such a device provides for the use of a single lens and an optical prism interposed between the lens and the two digital sensors (e.g. CCD) of the video cameras to separate the IR component from the visible component, or alternatively employs a single digital sensor sensitive to both infrared and visible components. An integrated device of this type enables both colour and infrared to be aligned with absolute precision (eliminating errors of parallax due to the flanking of the two video cameras) on a single multi-spectrum image. This makes the document produced much more difficult to contest, since not only are the images produced by the system simultaneous but they are also perfectly superimposed in space.

The set of processing modules indicated collectively with 16 in FIG. 4 (above all when it is situated remotely from the video cameras 12 and 14, and is thus able to serve a number of image-acquisition units) lends itself to being implemented in the form of an industrial computer (PCI) that acquires the video signals from the image-acquisition units 12 and 14 continuously and performs the processing steps described below.

This type of computer is capable of handling the incoming video stream from several video cameras and of processing the images in real time. Commercially-available motherboards based on PCI technology can handle up to four video streams, while commercially-available processors of 2.5 GHz can process the relative images. Applications with a larger number of video cameras may be handled with several computers connected in network for the interchange of information. The computer is generally equipped with an operating system that provides multi-tasking services, thanks to which processing comes about virtually in parallel, to the advantage of easy software implementation.

During the red traffic light phase (signalled by an external sensor P of known type) or continuously in other applications, the video stream from the video camera 12 is processed in a continuous manner by a module 100 capable of efficiently activating procedures to read the license plate T.

These techniques are per se known and are referred to in the sector as LPR, or License Plate Recognition, techniques.

Figure 5:
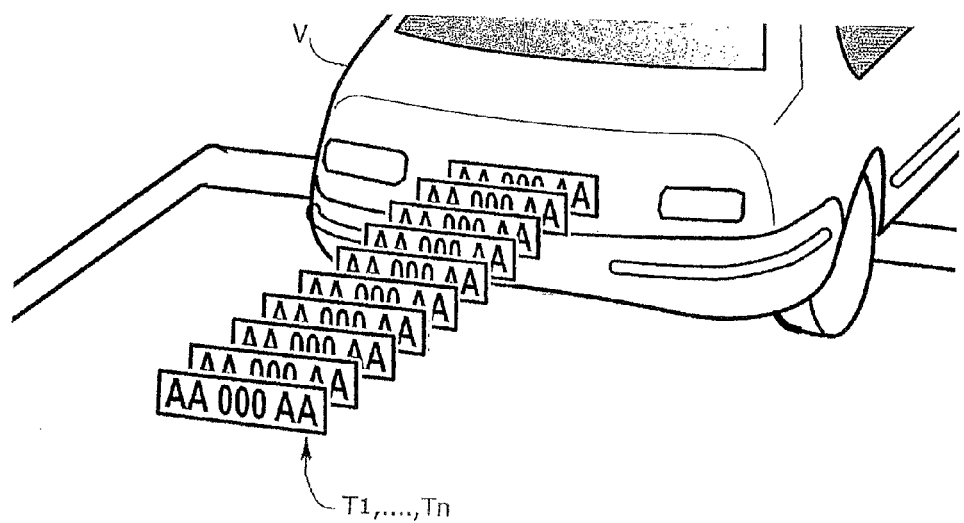
FIGS. 5 and 6 show the operation of the system described here.

This processing enables the system firstly to detect the presence of a license plate T: this generally comes about as the outcome of a test module 102 that detects the fact that the relative information persists through a series of n images in real time (T1, . . . , Tn in FIG. 5). Typical values of n are between 5 and 15, depending on the effective speed of the vehicle and the image acquisition geometry. Frequency of image acquisition and camera orientation ensure vehicles will be detected even at high speeds (e.g. 300 km/h).

If the test 102 has positive outcome (and the presence of a false alarm is excluded), the system deduces the presence of a vehicle V in transit (and thus of an infringement, if the traffic light is red at the time). In particular this involves activation of a Plate Tracking module 104 and the generation of a "plate event" 106.

This aspect is significant because, unlike what occurs in most systems known today (in which an external sensor detects the passage of the vehicle and in consequence activates a visual detector, such as a camera, that photographs the vehicle and the license plate), operation of the system described here is based on the fact that the visual detector (that is the video camera 12) is itself capable of detecting and recognising the passage of a license plate and thus the transit of a vehicle.

The possibility of reading license plates in real time is linked to the possibility of concentrating the action of the most computationally complex parts of the LPR process onto a small portion of the entire image (localisation of the license plate). This is possible thanks to the peculiar pictorial characteristics of license plates, that can be exploited in different ways to achieve quick and effective localisation methods such as those described in H. Bai et al. "A fast license plate extraction method on complex background", IEEE Intell. Tran. Sys. Vol. 2 (2003).

By precisely locating the area of the license plate on the image, the system can also check the exposure of the plate, independent of the luminance of the remainder of the scene, and can modify exposure time of the video camera 12 for the subsequent frames.

The automatic analysis also exploits the a priori knowledge of the planar motion of the license plate and, with the use of appropriate processing of the movement of the plate itself (Plate Tracking) also provides an estimate of the direction of instantaneous motion of the vehicle in transit. The motion of planar objects observed on an image is described by transformations of co-ordinates known as homographies (see, for example: R. Hartley, A. Zisserman "Multiple View Geometry in Computer Vision", Cambridge University Press, 2004). Tracking them on images is made possible by rapid algorithms such as those reported in C. Stiller, J. Konrad "Estimating Motion in Image Sequences", IEEE Signal Proc. Mag. Vol. 16 (1999). The use of information relating to motion enables the image portion analyzed by the reading procedures to be further restricted.

As is indicated diagrammatically with a dashed line in FIG. 4, the function of controlling excess speed preferably involves the installation of a second video camera 12' (configured in a substantially identical manner to video camera 12, including with regard to the modules associated to it, indicated by the same numbers with a prime).

It is thus possible to combine the function of reading and tracking the license plate (LPR+Plate Tracking) put in place by the video camera 12 and by the modules associated to it, with stereometric techniques of the type described, for example, in O. Faugeras "3D-Computer Vision", MIT Press (1993). Given any pair of corresponding points between video cameras 12 and 12', stereometry makes it possible to determine the absolute position of the three-dimensional point observed. Combining this measurement with the estimate of motion obtained by Plate Tracking (and obviously knowing the separation in time between the different images), an estimate of velocity is obtained.

Thanks to these techniques, the instantaneous velocity measurement is calculated in an objective and highly precise manner, as well as being univocally associated to one specific license plate. By way of example, with a spacing of 1 m between video camera 12 and video camera 12', it is possible to measure velocity with a precision of 1%, thus amply sufficient for the purposes of the system.

Video cameras 12 and 12' require a disposition that is stable over time to guarantee precision of measurement. Thus the video cameras are preferably rigidly constrained to a single support structure and contained in a single housing that ensures protection against tampering, collision, stress due to temperature changes, humidity, pressure and other atmospheric agents. For this purpose, as is shown more clearly in FIG. 7, the video cameras are fixed to a structure made of material (metal, carbon fibre) appropriate to maintain their disposition rigid. This structure is fixed to the support 1000 through spacers of elastic material without being directly fixed to the housing 1200. Thus the structure and the video cameras constrained to it do not undergo the effects of any mechanical stress or other agents that affect the housing. A supplementary covering can further protect the housing from solar radiation, reducing any thermal expansion of the system.

The end results of the LPR process is thus a transit event (Plate Event) 106, to which is attached an alphanumeric string of the license plate and of the trajectory observed on the image (and of the estimated velocity in the case of stereometric disposition).

The functions described above are not however automatically capable of certifying the violation in all of its spatial dynamics, where this is necessary (for example failure to stop at a red traffic light, overtaking), nor of processing or producing colour images of the vehicle.

For this purpose, the signal of the video camera 14, which is acquired continuously by a module 200 that efficiently implements movement analysis procedures of the type normally known as Motion Analysis (see for example the article by Stiller and Konrad quoted above) and Structure From Motion or SFM (see, for example, T. Jebara, A. Pentland "3D structure from 2D motion", IEEE Signal Proc. Mag. Vol. 16-1999).

As in the case of module 100 (and 100'), a test module 202 is associated to the module 200 and is destined to check—in a known manner—that the situation is effectively one of a three-dimensional object in motion (and not of an artefact) after which it activates an SFM artificial vision module 204.

The SFM technique is a computer vision technique whereby, from analysis of the motion of a rigid object on a two-dimensional (2D) image, information about its structure and about its motion in three dimensions (3D) can be extracted. Thanks to this processing, the module 204 detects the position and three-dimensional shape of the vehicle committing the infringement in the entire zone and for the entire interval of time of the violation.

The end result is a transit event (Vehicle Event) 206 to which information concerning kinematics and the dimensions of the vehicle is associated.

In some applications, instantaneous detection of position is of particular importance. For example, in the case of failure to stop at a red traffic light, detecting the instantaneous position enables the position of the front of the vehicle with regard to the traffic light to be checked at the instant when it changes from yellow to red.

The SFM technique in such contexts is particularly effective because it enables information concerning the rigidity of objects to be exploited, and thus manages ambiguous situations in which different objects move in the scene with different motions to be resolved.

Figure 6:
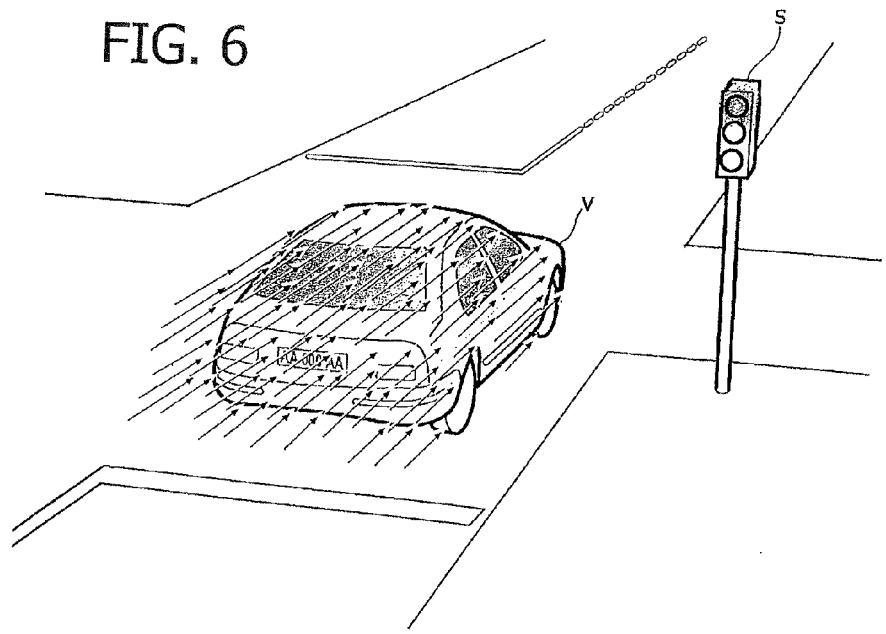

The SFM technique is based on the automatic tracking function of salient points of an object (vehicle) and the application of constraints of rigidity of motion in the three dimensional world, as shown diagrammatically in FIG. 6 with the super-impression of vectors of motion whose length is proportional to the velocity detected on the image plane and whose direction identifies the trajectory of movement of the vehicle. It is precisely the different lengths of the vectors measured on the image plane that enables information about the 3D structure of the object to be deduced.

By analysing the three-dimensional motion of the objects in the scene, it is therefore possible to identify individual moving objects even in highly-complex situations (such as a road intersection among several different directions) or in scenes in which the motion of vehicles is partially masked by the motion of people (for example in areas reserved for pedestrians) and to select only those motions (and thus only those vehicle) that are significant for the particular application.

In applications requiring dynamic analysis of the motion of the vehicle throughout its entire transit, similarly to what was said above relating to video camera 12 being flanked by video camera 12', video camera 14 and its relative modules/functions may also be combined with a second colour video camera 14' appropriately distanced from the first and identically configured with modules 200'-204', dual with regard to modules 200-204.

The use of stereometry (see, for example, the work by O. Faugeras cited above) combined with motion provides absolute characterisation of the vehicle's motion and shape. As has already been said, the use of stereometry enables metric measurements to be made on the images, relating both to dimensional quantities and to kinematics. In the case in point, however, a further peculiarity of the combination between analysis of motion and stereometric analysis must be mentioned. In analysis of motion with a single video camera, to estimate the motion of a point P between two instants in time t1 and t2, only two images are available, and thus only one possible correspondence can be evaluated. Thus there are no redundant data, such that a possible error at this level cannot be intercepted. In the stereometric disposition, 4 pairs of images are available to estimate the same motion, so that the same number of independent correspondences can be extracted. The estimate is therefore more robust, and must therefore be confirmed 4 times in order to be validated. Furthermore, having available images of successive instants in time t3, t4, t5 . . . the estimate may be made even more robust by reiterating the validation check.

Figure 7:
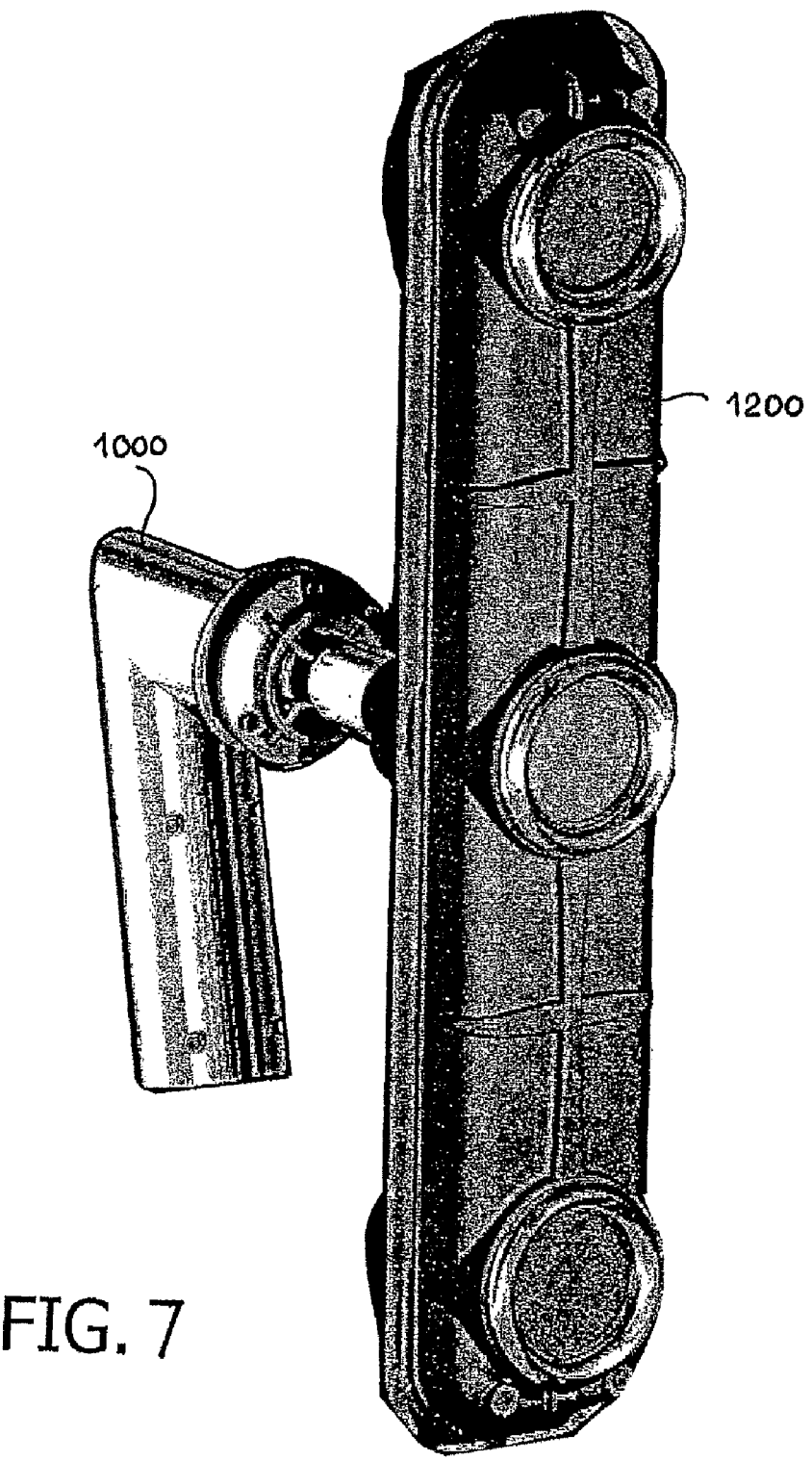
FIG. 7 shows an actual embodiment of one of the elements of the system described here.

As we have already said, the precision of the measurements depends on the rigidity of the disposition of the video cameras 12 and 12'. Moreover, the stereometric disposition benefits from the following further property: given that the corresponding points of the pairs of stereo images respect the epipolar constraint (see the work by O. Faugeras already cited) any loss of this rigidity and thus the change in relative position between video camera 12 and video camera 12' may automatically be diagnosed by the image processing function, detecting the failure to respect the above epipolar constraint in the correspondence between points in the pairs of images. More in detail, compliance with the epipolar constraint is lost in the case of rotation between the video cameras or general translation, while compliance is not lost only in the case of translation along the line joining the two image centres. The structure in FIG. 7 is designed to be indeformable, in particular in the sense of its length, and thus translation between the video cameras is virtually nil, whereas if it is subjected to high stresses it might twist and vary in rotation. In conclusion, thanks to the epipolar check, the system self-diagnoses any changes in positioning. This provides a guarantee of the reliability of the system that is technically not found in all other systems to measure velocity, and thus makes on-site calibration of the instrument superfluous.

The SFM technique exemplified here operates on colour images in which the license plate cannot be read with certainty. Thus the SFM technique—of itself—in general only provides partial data for a system to detect infringements.

The signals from the two video cameras 12 and 14 (and if present 12' and 14') are processed in parallel and virtually independently; to speak of "virtual" independence intends to points up the fact that although the two chains of processing, operating on the signals from the two video cameras 12 and 14, have different ways of functioning and pursue different goals, they can exchange information with each other during processing to further improve the efficiency of the entire process.

The exchange of information between the modules may come about in a two-directional way. By way of a non-exclusive example, two typical modalities may be mentioned:

1) the LPR module detects a license plate in a certain position on the IR image, and in consequence the SFM module activates generation of a possible vehicle in the corresponding position on the colour image.

2) the SFM module detects the presence of a moving object at a certain position on the colour image, and in consequence the LPR module generates a window of attention in the corresponding position on the IR image.

In this way, the two modules can also act co-operatively, their independent capability to process relevant video data remaining good.

A supervision module 300 associates the data from the two processing operations in the instants and in the images in which the vehicle is present in both, usually also exploiting information on the operating cycles of the traffic light S provided by the sensor P.

License-plate reading and tracking processing on the video signal from the video camera 12 guarantees the transit of a vehicle V will be detected in all lighting conditions. Furthermore, it discriminates a vehicle from any other object not having a license plate, eliminating cases of faulty detection of vehicles with trailers, of close queues of vehicles, of people passing on foot or bicycle, or of any other movement or variation in the luminance of the scene.

Processing (for example SFM) of the signal from the video camera 14 enables the transit of a vehicle to be tracked in all lighting conditions throughout its route, and provides the three-dimensional reconstruction and colour images of the vehicle itself, thus effectively and fully-automatically verifying the effective violation and describing the kinematics of the vehicle, if necessary.

The supervisor module 300 uses the partial data from the two processing operations and provides complete information both about the identity of the vehicle (license plate) and about the type of vehicle (3D shape and colour image) and the dynamics of the violation (vehicle trajectory in space-time terms).

This data fusion operation concerning the two types of transit detected independently, actuated in a module 302, is of particular interest since the association of data from the individual image-acquisitions enables the characteristics of resolution and readability of the narrow-field IR image (video camera 12) to be combined with the pictorially-significant panoramic view of the wide-field colour image-acquisitions (video camera 14).

This association is here possible thanks to the capability of the 3D vision techniques to bring into correspondence observations of the same event made on images with different characteristics.

The association is based on the fact that the two different camera positions are known, and thus it is possible to establish in an absolutely univocal manner whether two motions observed through video cameras 12 and 14 correspond to the same three-dimensional motion or not. The law of correspondence, exemplified by a mathematical transformation between the co-ordinates of the two images (here again see the already-cited work by R. Hartley, "Multiple View Geometry in Computer Vision"), is determined once and for all during calibration.

In the case in which stereometric information is available on the instantaneous velocity and/or on the dynamics of the vehicle, the supervisor module 300 directly performs their integration, obviously improving the precision of the data provided.

The number of images that document the violation is not limited by the technology, as in the case of cameras, but is freely defined on the basis of the actual need to document the act of violation.

In particular, the supervisor module 300 is capable of selecting an adequate number of images that document the violation. The number of photographs made available by the two video cameras 12, 14 is very large, and thus abundantly ample with regard to the documentation purposes required for most applications.

For this reason, the supervisor module 300 sub-samples the image sequences with a rate inversely proportional to the speed of transit of the vehicle, so that the number of images that document the violation is constant and independent of the transit time through the controlled area.

The module 304 super-impresses on the images an alphanumeric string with data relating to locality and instant of acquisition, and a module 306 compresses the images with known technology (e.g. JPEG).

For each violation detected, the system thus creates a specific data record, completing it with all the information extracted automatically, if desired encrypting the record for security purposes.

A module 308 stores locally and/or transfers the records thus created to an archive 400 situated at the control unit 18.

All the functions described can be implemented efficiently according to known criteria and are capable of processing the images in real time. Thanks to this characteristic, the system processes the images and may instantaneously decide whether to store them or cancel them.

The mass archive 400 of the system may thus be of sufficient size to document the violations, without storing all data provided by the image-acquisition units 12, 14 in their entirety.

The principal goal of the central unit 18 is that of receiving the records relating to violating transits that are received at the control centre and collecting them in the archive 400. It is provided with a module with man-machine interface 402 with associated to it a module 404 that enables the data to be decrypted so as to be appropriately managed by the operator.

Thanks to the automatic reading of the license plate, the central unit 18 may fully-automatically search for the identity of the vehicle's owner (module 406) without the operator intervening.

In general, possible applications of the system are numerous, and some of them may require simple integration of the basic configuration, as described below.

For example:
  detecting in real time failure to stop at red traffic lights, thanks to integration with the sensor P that interacts with the traffic light and detects in real time the phase of the traffic light present at that moment and activates the system;
  exceeding the speed limit, thanks to the use of a second video camera (12') and to digital stereometric techniques that calculate the velocity of the vehicle with high precision;

overtaking where not permitted, with if necessary the additional use of colour video cameras (14') that detect and document the entire trajectory should this be longer than that viewed by a single video camera;

transit of vehicles of a size category that is not permitted, thanks to the dimensional control of vehicles achieved through the SFM data or those from external sensors (e.g. weight in motion sensors, WIM);

transit not permitted by another type of detector, for example RFID tag, thanks to integration with the radio-frequency system to detect access;

access to a limited traffic zone, thanks to analysis of movement and thus determination of the direction in which the vehicle is travelling;

driving on the wrong side of the road, and other abnormal or anyhow dangerous behaviour.

It follows that, without prejudice to the underlying principle of the intervention, the details and embodiments may be widely varied with regard to what is described and illustrated, without thereby departing from the scope of the present invention as defined by the attached claims.

The invention claimed is:

1. A system to detect the transit of vehicles having license plates, the system comprising:
    at least one video camera to detect license plates capable of framing the license plates of said vehicles and of generating a corresponding video signal, and
    a first processing chain sensitive to said video signal to perform license-plate-recognition processing on said video signal,
    at least one video camera to detect said vehicles capable of framing a zone of transit of said vehicles having license plates and of generating a respective corresponding video signal, and
    a second processing chain sensitive to said respective video signal to perform on said respective video signal vehicle-tracking processing to detect the position and three-dimensional shape of said vehicles in transit in said zone,
    said first processing chain including a test module to detect the presence of a vehicle in transit by performing a test as to whether an image of a license plate persists on a series of images of said video signal, and a plate-tracking module which is activated by said test module when the license plate persists on the series of images,
    a supervisor module that aggregates the results of said first processing chain and said second processing chain to generate information records, each record of said records identifying the transit modality in said zone of a vehicle identified by a given license plate tracked and recognized by said first processing chain.

2. The system according to claim 1, further comprising:
    at least one video camera to detect vehicles capable of framing a zone of transit of said vehicles having license plates and of generating a respective corresponding video signal, and
    a respective chain of processing sensitive to said respective video signal to perform on said respective video signal vehicle-tracking processing to detect the position and three-dimensional shape of vehicles in transit in said zone.

3. The system according to claim 2, further comprising a supervisor module that aggregates the results of said license-plate-recognition processing and said vehicle-tracking processing to generate information records, each of said records identifying the transit modality in said zone of a vehicle identified by a given license plate recognised by said chain of processing.

4. The system according to claim 2 wherein said video camera to detect license plates and said video camera to detect vehicles are included in a single video camera detection device.

5. The system according to claim 2 wherein said video camera to detect license plates and said video camera to detect vehicles are distinct co-positioned devices.

6. The system according to claim 1, wherein said video camera to detect license plates operates in the infrared spectrum.

7. The system according to claim 1, wherein said video camera to detect license plates is fitted with a narrow-field lens.

8. The system according to claim 1, wherein said video camera to detect license plates is provided with an illuminator that emits with wavelength in the same range of sensitivity of said video camera to detect license plates.

9. The system according to claim 8, wherein said illuminator is a stroboscopic illuminator and is synchronised with said video camera to detect license plates.

10. The system according to claim 2, wherein said video camera to detect vehicles is a video camera operating in the visible field.

11. The system according to claim 2, wherein said video camera to detect vehicles is a wide-field lens that frames all of said zone of transit of said vehicles having license plates.

12. The system according to claim 2, wherein said video camera to detect vehicles is a colour video camera, with a consequent possibility of detecting the condition of at least one light of adjacent traffic lights.

13. The system according to claim 1, wherein said video camera to detect license plates and/or said video camera to detect vehicles generate video signals provided with time/date imprint that identifies the instant at which they were recorded.

14. The system according to claim 1, further comprising:
    said video camera to detect license plates being coupled with a homologous video camera to detect license plates to generate a corresponding homologous video signal, and
    said chain of processing being sensitive to said video signal and to said homologous video signal to conduct on said video signal and on said homologous video signal stereometric processing to determine the speed of said vehicle in transit.

15. The system according to claim 2, wherein said respective chain of processing sensitive to said respective video signal is configured to perform on said respective video signal processing of the Structure From Motion or SFM type.

16. The system according to claim 2, further comprising:
    said video camera to detect vehicles being coupled to a homologous video camera to detect vehicles and to generate a respective homologous video signal, and
    said respective chain of processing being sensitive to said respective video signal and to said respective homologous video signal to perform stereometric processing on said respective video signal and on said respective homologous video signal to provide absolute characterisation of the motion and of the shape of said vehicle in transit.

17. The system according to claim 3, wherein said supervisor module is configured to sub-sample in a manner that is inversely proportional to the speed of transit of the vehicle, the sequences of images generated by said video camera to detect license plates and by said video camera to detect vehicles.

18. The system according to claim 3, wherein said supervisor module is configured to super-impress on the images of said vehicles in transit a vectorial representation with lines whose length is proportional to the velocity detected and whose direction identifies the trajectory of movement of the vehicle.

19. The system of claim 1, wherein said at least one detection video camera is constrained to a support through spacers of elastic material, and is protected by a housing without constraints to said housing.

20. The system according to claim 1, further comprising a pair of detecting video cameras, said chain of processing being capable of automatically detecting changes in the relative position between the video cameras of said pair.

21. The system according to claim 20, wherein said chain of processing is configured to automatically detect changes in the relative position between the video cameras of said pair detecting the failure to comply with an epipolar constraint in the correspondence between points in the respective pairs of images.

* * * * *